Figure 1:
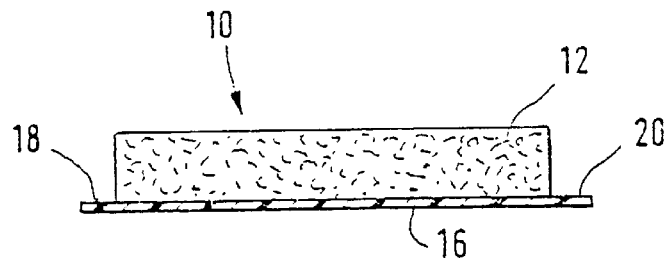

United States Patent

Behrens

[11] Patent Number: 5,983,561
[45] Date of Patent: Nov. 16, 1999

[54] VEGETATION ELEMENT

[76] Inventor: Wolfgang Behrens, Trespenmoor 25, D-27243 Gross Ippener, Germany

[21] Appl. No.: 08/997,376

[22] Filed: Dec. 23, 1997

[30] Foreign Application Priority Data

Dec. 23, 1996 [DE] Germany .................... 196 54 049

[51] Int. Cl.⁶ ........................................ A01C 1/04
[52] U.S. Cl. ..................................... 47/56; 47/59
[58] Field of Search ............................ 47/33, 39–9, 59

[56] References Cited

U.S. PATENT DOCUMENTS

| 4,135,330 | 1/1979 | Aoyama | 47/33 |
| 4,190,981 | 3/1980 | Muldner | 47/56 |
| 5,390,442 | 2/1995 | Behrens | 47/59 |
| 5,608,989 | 3/1997 | Behrens | 47/65.9 |
| 5,724,766 | 3/1998 | Behrens | 47/56 |

FOREIGN PATENT DOCUMENTS

| 0337085 | 10/1989 | European Pat. Off. . |
| 2438301 | 2/1976 | Germany . |
| 3805069 | 9/1989 | Germany . |
| 4219275 | 12/1993 | Germany . |
| WO 97/01687 | 1/1997 | WIPO . |

*Primary Examiner*—Peter M. Poon
*Assistant Examiner*—Francis T. Palo
*Attorney, Agent, or Firm*—Burns, Doane, Swecker & Mathis, L.L.P.

[57] ABSTRACT

A vegetation element for creating sod on artificial surfaces (such as roofs) is described. The vegetation element comprises a vegetation carrier consisting of synthetic and/or organic material for a vegetation, with the vegetation carrier consisting of at least one layer. The bottom layer of the vegetation carrier is attached to waterproof sheeting intended for sealing a roof to be sodded or designed as a rootproofing layer to prevent the roots from growing through.

13 Claims, 1 Drawing Sheet

VEGETATION ELEMENT

It is known that vegetation elements are used to sod artificial surfaces such as the roofs of houses. An important component of a vegetation element is the vegetation carrier, which may be designed with one or more layers and is made of synthetic and/or organic material. The vegetation carrier comprises, among other things, a substrate and seeds for the plants or the plants themselves and their roots.

The vegetation elements may be precultivated outside of their later site of use before they are installed on a roof. However, it is also possible to sod a roof directly on site and install the vegetation body directly on the roof. In the latter case, growth and cultivation of the plants take place on the roof itself.

Regardless of the procedure described, it is necessary in any case to install the vegetation element with the vegetation carrier on the respective roof, preferably a flat roof or a roof with a slight slope.

In practice, it must be recalled that the vegetation elements installed on a roof are exposed to outside influences in the form of erosion and wind suction forces, which can result in the vegetation elements being lifted up and blown away by the wind suction forces. This is especially true of thin, lightweight vegetation elements. However, mainly thin, lightweight vegetation elements are desired because then the roof is under a low load due to the low weight.

The object of the invention is to create a vegetation element which can be installed easily on a roof to create sodding and which is protected from erosion and wind suction forces despite its low weight.

The invention starts from the idea that the roof to be sodded is provided with a seal on its surface in the form of waterproof sheeting consisting of a suitable sealing material, e.g., PVC or bituminous roofing sheeting. In the past, the vegetation elements have been installed on this waterproof sheeting which is attached to the roof and usually has an underlayer of insulation.

The invention now provides for attaching a roofing sheeting to the bottom of the vegetation element or to the bottom layer of the vegetation carrier, thus forming a unit consisting of the vegetation element and the roofing sheeting. This new vegetation element is installed on the roof, attaching the waterproof sheeting to the roof surface mechanically or by some other method in a known way, just as in the past the waterproof sheeting alone was attached to the roof. When the waterproof sheeting is attached to the roof, the vegetation element connected to it is protected from erosion and wind suction forces, so that thin, lightweight vegetation elements can also be used in the desired manner.

When the new type of vegetation element is used, the conventional waterproof sheeting can be omitted from the respective roof, because it is already provided along with the vegetation element when the latter is installed. However, it is of course also conceivable to install the new vegetation element on roofs that have already been provided with a waterproof sheeting.

In many cases the waterproof sheeting already present on a roof was not designed to be rootproof, so there is the danger that the roots of the plants of a vegetation element might grow through the sheetina. In this case, the invention provides for the waterproof sheeting which is attached to the bottom layer of the vegetation carrier to be designed as a rootproofing layer.

The area of the waterproof sheeting is larger than the area of the vegetation carrier in this invention, so that the waterproof sheeting overlaps the vegetation carrier on two opposite sides, and there are free edges there. This is an advantage when several sheet-like vegetation elements are installed side by side. In the area of the free edges, the adjacent edges of the waterproof sheeting can be welded together. This yields a continuous closed waterproof sheeting for the roof. The free gap remaining under some circumstances between adjacent vegetation carriers can be filled subsequently with material of a vegetation carrier.

The waterproof sheeting can be glued or even welded to the bottom layer of the vegetation carrier in an advantageous manner.

Another expedient embodiment of the invention provides for a binder layer to be arranged between the bottom layer of the vegetation carrier and the waterproof sheeting, thus serving to attach the bottom layer of the vegetation carrier to the waterproof sheeting.

An especially secure hold between the vegetation carrier and the waterproof sheeting is achieved by attaching it through the binder layer. The waterproof sheeting has very fine pores, while the vegetation carrier may be designed with large pores, and under some circumstances a connection between one surface with large pores and another with fine pores may not be reliably long lasting. The binder layer assumes a type of adapter function to adapt the different surface structures of the waterproof sheeting and the vegetation carrier, and it ensures a secure attachment of the waterproof sheeting to the vegetation carrier.

Another embodiment of the invention provides for adhesives in the form of a dry adhesive to be arranged in or on the vegetation carrier. This yields the possibility of applying an additional vegetation layer to the vegetation carrier with the dry adhesive after the vegetation element has been installed on the roof. The dry adhesive is activated by adding water, and the additional vegetation layer is bonded with adhesive to the vegetation carrier below it or the layer below it, with the connection being maintained at least until a natural connection of the two layers is established in the sense of a biological reinforcement due to plant growth and the related root growth.

Furthermore, it is expedient to provide fertilizers or soil conditioners and/or soil additives in or on the vegetation carrier. This especially promotes the growth of the plants. Furthermore, seeds for the plants which are to form the subseauent sod may also be provided in or on the vegetation carrier.

In another expedient embodiment of this invention, the vegetation carrier serves as a rooting layer or as an irrigation and/or drainage layer, and it is provided to accommodate additional function layers. In these cases, it is thus the rooting layer or the irrigation and/or drainage layer of the vegetation carrier that is attached to the waterproof sheeting. Thus the rooting layer—the layer in which the roots of the plants essentially extend—or the irrigation and/or drainage layer may thus be followed by additional layers of the vegetation carrier having other functions.

Figure 2:
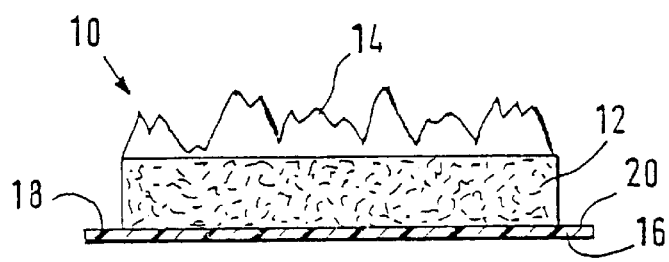
Figure 3:
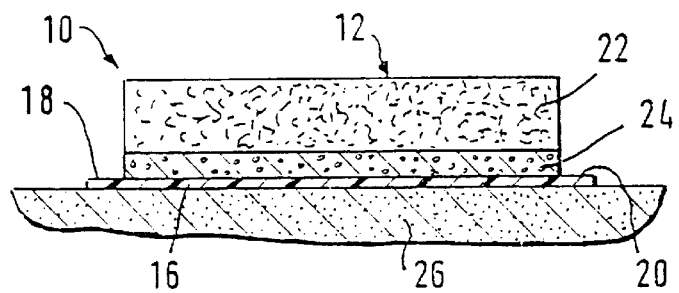
Figure 4:
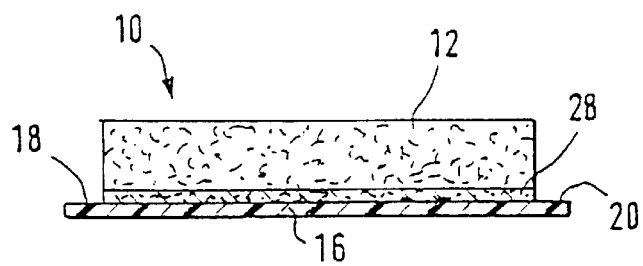

The invention is explained in greater detail below on the basis of the embodiments illustrated in the figures, which show the following:

FIG. 1: a cross-sectional view of a vegetation element with a waterproof sheeting, FIG. 2: a vegetation element according to FIG. 1, but with sodding, FIG. 3: a vegetation element on a roof with a two-layer vegetation carrier, and FIG. 4: another embodiment of a vegetation element.

Vegetation element 10 according to FIG. 1 comprises a vegetation carrier 12 which is attached on its bottom side to a waterproof sheeting 16. Waterproof sheeting 16 either serves to seal a roof to be sodded or is designed as a rootproofing layer to prevent the roots from growing through.

FIG. 2 shows the vegetation element according to FIG. 1 after cultivation is completed, so that vegetation element 10 is provided with sod 14 in the form of plan s.

FIG. 3 shows a vegetation element 10 whose vegetation carrier 12 is designed in two layers with a top vegetation layer 22 and a lower drainage layer 24. In this case, the bottom layer, i.e., drainage layer 24, is connected to waterproof sheeting 16 which is in turn attached to a roof 26 in a known manner and forms the sealing for roof 26.

With the vegetation element illustrated in FIG. 4, a binder layer 28 is provided between vegetation carrier 12 and waterproof sheeting 16 to attach vegetation carrier 10 to waterproof sheeting 16.

In general, the bottom layer of vegetation carrier 12 is attached to waterproof sheeting 16 by gluing or welding (i.e., with heat).

It can be seen in the diagrams according to FIGS. 1–4 that the area of waterproof sheeting 16 is larger than the area of vegetation carrier 12, so that a free edge 18 and 20 remains on each side. These edges 18 and 20 serve as welding edges when several strips of waterproof sheeting 16 with the vegetation element 10 on them are installed side by side on a roof and the individual strips of sheeting are welded together.

Waterproof sheeting 16 may be constructed in a known way and may consist of a suitable sealing material, e.g., PVC, or it may also be designed as a bituminous roofing sheeting.

I claim:

1. A vegetation element capable of being readily installed as a unit when creating sod on an artificial surface comprising a layer of vegetation carrier having upper and lower surfaces and a layer of waterproof sheeting attached to the lower surface of said vegetation carrier which is capable of protecting said artificial surface from moisture and preventing the penetration of plant roots and wherein said layer of waterproof sheeting possesses a larger area than said layer of vegetation carrier and is provided with a free exposed edge that is capable of overlapping a similar free edge of an adjacent vegetation element and is capable of being joined at said overlapping free exposed edge when present on an artificial surface so as to provide a continuous sealed waterproof and rootproof barrier which is capable supporting plant growth present in said layer of vegetation carrier of said vegetation element.

2. A vegetation element according to claim 1 wherein said lower surface of said layer of vegetation carrier is attached to said layer of waterproof sheeting by glue.

3. A vegetation element according to claim 1 wherein said layer of waterproof sheeting is a bituminous sheet.

4. A vegetation element according to claim 2 wherein said lower surface of said layer of vegetation carrier is welded to said bituminous sheet following the application of heat.

5. A vegetation element according to claim 1 wherein a binder layer is present between said layer of vegetation carrier and said layer of waterproof sheeting which is capable attaching said layers.

6. A vegetation element according to claim 1 wherein a dry adhesive activatable by water is provided in association with said layer of vegetation carrier.

7. A vegetation element according to claim 1 wherein a fertilizer is included in said layer of vegetation carrier.

8. A vegetation element according to claim 2 wherein a fertilizer is included in said layer of vegetation carrier.

9. A vegetation element according to claim 1 wherein a soil conditioner is included in said layer of vegetation carrier.

10. A vegetation element according to claim 2 wherein a soil conditioner is included in said layer of vegetation carrier.

11. A vegetation element according to claim 1 wherein seeds are included in said layer of vegetation carrier.

12. A vegetation element according to claim 2 wherein seeds are included in said layer of vegetation carrier.

13. A vegetation element according to claim 1 wherein a drainage layer is disposed intermediate said layer of vegetation carrier and said layer of waterproof sheeting.

* * * * *